US012560106B2

(12) United States Patent
Mariotti

(10) Patent No.: US 12,560,106 B2
(45) Date of Patent: Feb. 24, 2026

(54) BALANCED GRID VALVE FOR STEAM EXTRACTION

(71) Applicant: Nuovo Pignone Tecnologie—S.r.l., Florence (IT)

(72) Inventor: Vanessa Mariotti, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 2 days.

(21) Appl. No.: 18/685,562

(22) PCT Filed: Aug. 23, 2022

(86) PCT No.: PCT/EP2022/025387
§ 371 (c)(1),
(2) Date: Feb. 22, 2024

(87) PCT Pub. No.: WO2023/025415
PCT Pub. Date: Mar. 2, 2023

(65) Prior Publication Data

US 2024/0352876 A1 Oct. 24, 2024

(30) Foreign Application Priority Data

Aug. 27, 2021 (IT) ........................ 102021000022412

(51) Int. Cl.
*F01K 7/38* (2006.01)
*F01D 17/14* (2006.01)
*F01K 7/34* (2006.01)

(52) U.S. Cl.
CPC .............. *F01K 7/38* (2013.01); *F01D 17/145* (2013.01); *F01K 7/345* (2013.01); *F05D 2220/31* (2013.01); *F05D 2240/12* (2013.01); *F05D 2260/60* (2013.01)

(58) Field of Classification Search
CPC ... F01K 7/38; F01K 7/345; F01K 7/34; F01D 17/145; F01D 17/141; F05D 2220/31; F05D 2240/12; F05D 2260/60
See application file for complete search history.

(56) References Cited

U.S. PATENT DOCUMENTS

| | | | | |
|---|---|---|---|---|
| 3,669,562 A * | 6/1972 | McNally et al. | ..... | F01D 17/141<br>415/104 |
| 5,383,763 A * | 1/1995 | Henkelmann | ........... | F01D 17/18<br>415/150 |
| 5,409,351 A * | 4/1995 | Geist | ....................... | F01D 17/18<br>415/150 |
| 2015/0226089 A1* | 8/2015 | Roy | ...................... | F01D 17/145<br>415/68 |
| 2024/0352876 A1* | 10/2024 | Mariotti | ................ | F01D 17/141 |

FOREIGN PATENT DOCUMENTS

| | | | |
|---|---|---|---|
| EP | 1970543 B1 | 9/2008 | |
| EP | 2716877 A1 * | 4/2014 | ........... F01D 17/145 |

* cited by examiner

*Primary Examiner* — J. T. Newton
(74) *Attorney, Agent, or Firm* — Paul Frank + Collins P.C.

(57) ABSTRACT

A balanced grid valve for steam extraction from a multi-stage steam turbine comprising a first balancing chamber and a second balancing chamber which are configured to receive steam at high pressure through at least one duct. The balancing chambers are preferably in the form of annular grooves and are arranged at two different radial distances from the axis of the valve in order to reduce mechanical distortion of the valve.

20 Claims, 5 Drawing Sheets

BALANCED GRID VALVE FOR STEAM EXTRACTION

TECHNICAL FIELD

The subject-matter disclosed herein relates to a balanced grid valve for steam extraction from a multi-stage steam turbine.

BACKGROUND ART

Often, steam turbines are used to generate electric energy by transforming steam thermal energy to mechanical energy (turbine rotation).

Multi-stage steam turbines may be provided with an extraction valve between a high-pressure turbine section and a low-pressure turbine section in order to extract steam at a desired pressure from the steam cycle. The extracted steam is used mainly for applications other than turbine rotation; for example, it can be used to process goods, such as in a paper mill or in a food factory, or it can be used as heating fluid. So, it is desirable to extract steam at a desired pressure, advantageously constant over time both for ensuring an extracting flow with desired characteristics and for ensuring turbine efficiency.

This can be done by positioning an extraction valve between two intermediate turbine sections or stages: an extraction manifold is placed upstream the extraction valve and the steam extraction pressure may be regulated through the extraction valve. Typically, an extraction valve is a grid-type valve including a fixed grid and a rotating grid that cooperate in order to define a variable flow passage depending on the reciprocal position of the fixed grid and the rotating grid. By varying the flow passage, the extraction valve can regulate the pressure at the extraction valve and thus the pressure of the stream being extracted through the extraction manifold connected upstream the valve.

It is to be noted that the steam pressure upstream and downstream the extraction valve is different. In particular, the pressure difference of steam upstream and downstream the extraction valve increases with the increase of the value of steam mass-flow that is extracted. The pressure difference across the extraction valve results in an axial force applied on the valve surface exposed to high-pressure steam that pushes the rotating grid against the fixed grid, increasing contact force between the two grids, and thus friction between them.

For this reason, known extraction valves are subject to pressure difference limits across them so that the two grids can still rotate with respect to each other. One of the known methods to increase the limit for extraction valve pressure difference, is to have a balancing chamber between the grids which is supplied with high-pressure steam in order to locally separate the two grids and decrease the friction between them.

EP1970543B1 discloses a device for adjusting the extraction pressure of a steam turbine comprising a fixed grid and a rotating grid, the fixed grid comprising a groove that acts as a balancing chamber when it is supplied with high-pressure steam bled from a stage located upstream a stream extraction nozzle in order to separate the grids and to reduce the forces acting on the grids.

It is to be noted that such local separation of grids derives from a force localized at the balancing chamber. This results in a "umbrella effect" on the rotating grid due to the fact that the force is applied far away from the grid rotation axis, for example increasing local wear at the part of the grid near the grid rotation axis, i.e. far away from the force application area, and leakage near the balancing chamber, i.e. near the force application area. Moreover, if the force applied is too high, then the grids are unable to move relative to each other due to the excessive friction at the part of the grid near the grid rotation axis.

Therefore, currently available extraction valves have technical limits of pressure differences; in particular, they can work with pressure differences up to 10-15 bar.

SUMMARY

The Applicant has carried out tests and analysis and has realized that it would be desirable to have extraction valves, i.e. valves which allow to control the amount of flow that is extracted from the main flow of the steam turbine, that can work even with greater pressure differences, for example up to 60 bar, so that, for example, the required value of extraction pressure can be increased (extraction pressure is the pressure in the section of the steam turbine where the extraction valve is located). In particular, it would be desirable to have a balanced grid valve, which is a type of extraction valve, that can extract an amount of flow at an increased extraction pressure.

According to an aspect, the subject-matter disclosed herein relates to a balanced grid valve having a first balancing chamber and a second balancing chamber. Each of the first balancing chamber and the second balancing chamber are configured to receive a fluid at sufficiently high pressure or pressures through at least one duct. In one embodiment, the fluid may be steam. Advantageously, the chambers are fluidly coupled with each other via one or more channels (or grooves). The balancing chambers function to lower the axial force on the valve due to extraction pressure. The balancing chambers are arranged at two different radial distances from a central horizontal axis of the valve in order to reduce the distortion of the valve. In particular, the distortion of the valve may occur as an "umbrella effect", wherein the valve area near the balancing chamber is pushed away from the valve support due to the high pressure inside the balancing chamber. Embodiments of the new balanced grid valve, including rotating equipment coupled with it, offer several advantages, including that use of the new balanced grid valve described, shown and/or claimed herein can facilitate lower peak pressures on interior valve surfaces, thereby facilitating movement of the valve between open and closed positions and reducing wear of valve components.

According to another aspect, the subject-matter disclosed herein relates to a steam turbine equipped with an embodiment of the new balanced grid valve described, shown and/or claimed herein, wherein, the balanced grid valve has at least two balancing chambers.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
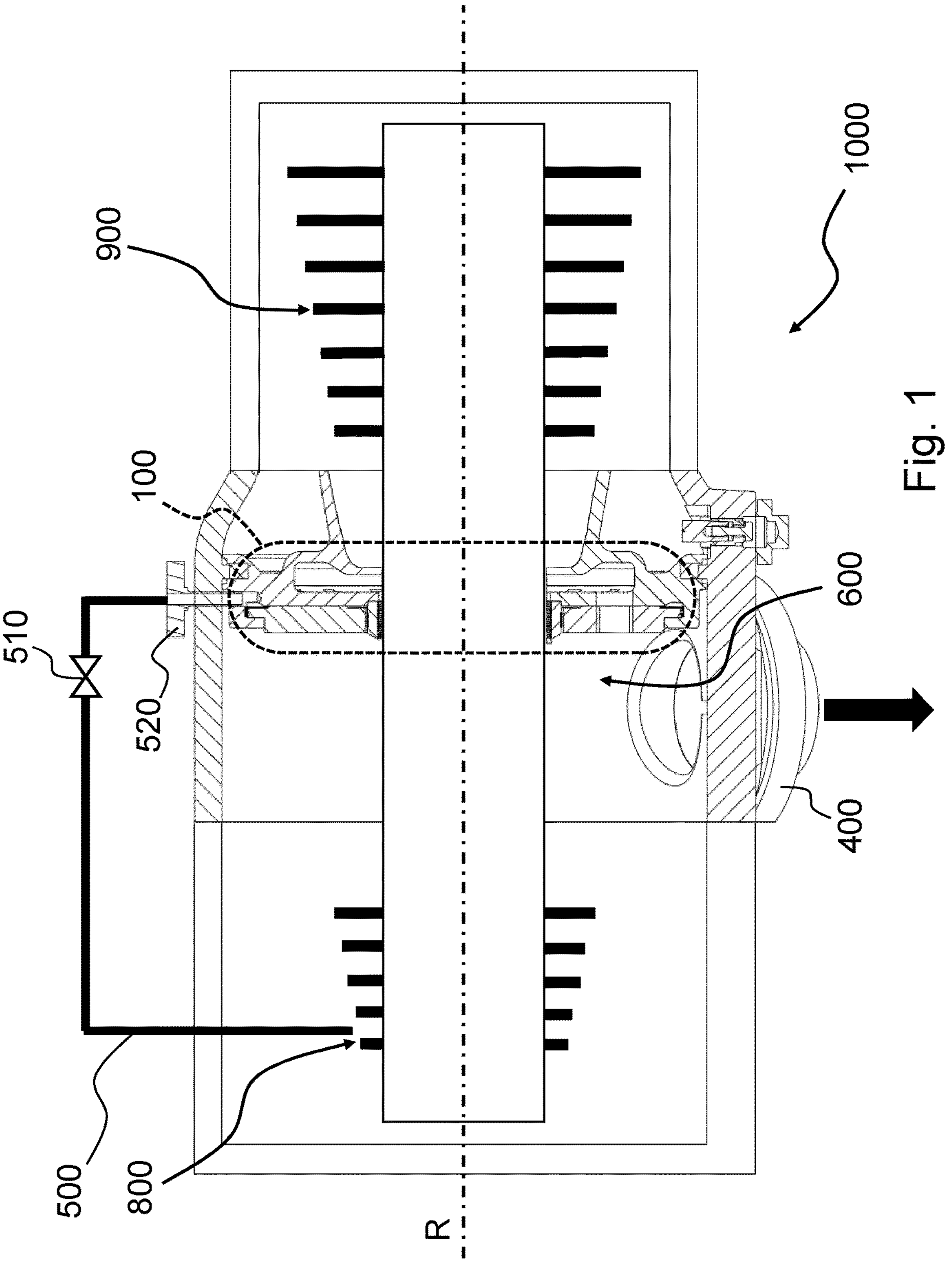
FIG. 1 shows a cross-section view of a piece of rotating equipment, in particular a multi-stage steam turbine, provided with an embodiment of the balanced grid valve.

The subject matter disclosed herein relates to an innovative balanced grid valve for a multi-stage steam turbine. The balanced grid valve is positioned and coupled with the steam turbine so that steam flowing through the steam turbine can be extracted at higher pressure with respect to known extraction valves and routed away from the steam turbine. The innovative balanced grid valve includes, among other things, two balancing chambers at different radial distances from a horizontal center axis of the valve. Each of the two balancing chambers is configured to receive a fluid extracted from a last stage of a high pressure section of the rotating equipment through at least one duct. In one embodiment, the rotating equipment is a multistage steam turbine, and the fluid is (or comprises) high pressure steam of at least 60 bar. In particular, the two balancing chambers may take the form of two annular and concentric grooves, each having two different radii from the valve's horizontal center axis.

Reference will now be made in detail to embodiments of the disclosure, an example of which is illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure.

Referring now to the drawings, FIG. 1 schematically shows, for example and without limitation, a piece of rotating equipment indicated with reference numeral 1000. In one embodiment, the rotating equipment 1000 is a multi-stage steam turbine. The multi-stage steam turbine 1000 is configured to process a flow of fluid (steam) through flow expansion and extract power from the flow expansion. The multi-stage steam turbine 1000 is further configured to extract a flow of fluid (steam) exiting a final stage of a high-pressure section of the turbine 1000 through an innovative balanced grid valve 100.

The multi-stage steam turbine 1000 is provided with an embodiment of an innovative balanced grid valve generally indicated with reference numeral 100. The balanced grid valve 100 is configured to be arranged between two intermediate stages of the multi-stage steam turbine 1000. Advantageously, the balanced grid valve 100 is arranged between a high-pressure turbine section 800 and a low-pressure turbine section 900, each turbine section having at least one stage, preferably multiple stages in series.

The balanced grid valve 100 is configured to extract steam at high pressure; preferably, the pressure of extracted steam is substantially constant over time. The multi-stage steam turbine 1000 comprises a flange 400 which is fluidly coupled to the balanced grid valve 100. In particular, the flange 400 is fluidly coupled to an annular chamber 600 which couples the last stage of the high-pressure turbine section 800 with the balanced grid valve 100; in particular, the annular chamber 600 is the section of the multi-stage steam turbine 1000 where the flow of steam is extracted. The big arrow in FIG. 1 departing from the flange 400 indicates that through flange 400, the balanced grid valve 100 may supply the extracted steam to one or more external units, for example by connecting a manifold to the flange 400.

Figure 2:
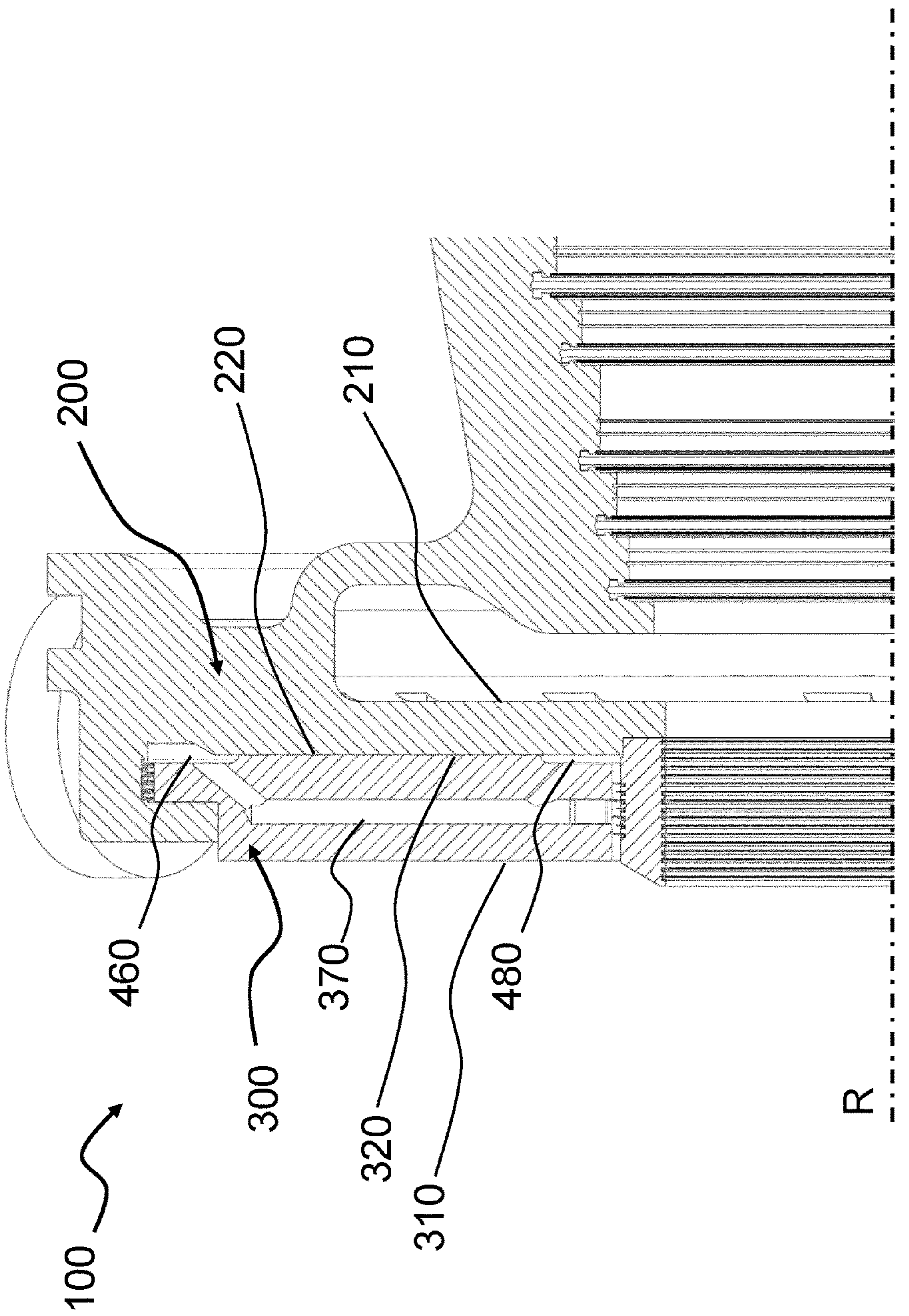
FIG. 2 shows a partial cross-sectional view of the embodiment of a balanced grid valve included in the turbine of FIG. 1.

FIG. 2 shows a partial cross-sectional view of the multi-stage steam turbine 1000 provided with an innovative embodiment of balanced grid valve 100; in FIG. 2, only the upper part of the valve 100 and a small portion of the low-pressure turbine section 900 are shown; in particular, the valve support is integrated with the stator casing of the turbine section.

According to this embodiment, the balanced grid valve 100 comprises a valve support 200 that is fixed to the multi-stage steam turbine 1000 and a valve body 300 that is rotatable with respect to the valve support 200 around an axis R. As it will be apparent from the following, the valve body 300 may be rotated to vary the steam flow passing through the balanced grid valve 100. In particular, by rotating the valve body 300 the passage area for the steam flow of the balanced grid valve 1000 is reduced; by reducing the passage area, the steam flow through the valve is laminated and the amount of steam flow that is extracted from the multi-stage steam turbine 1000 is increased.

The valve support 200 has a first side 210 and a second side 220; the first side 210 is configured to be exposed to a first flow of the steam processed by the multi-stage steam turbine 1000; the first flow is at a first pressure, so that the first side 210 is subject to a first pressure.

The valve body 300 has a first side 310 and a second side 320; the first side 310 is configured to be exposed to a second flow of the steam processed by the multi-stage steam turbine 1000; the second flow is at a second pressure, so that the first side 310 is subject to a second pressure.

The second pressure is greater than the first pressure. In other words, the first side 210 of the valve support 200 is arranged to be coupled with the low-pressure turbine section 900 of the multi-stage steam turbine 1000 and the first side 310 of the valve body 300 is arranged to be coupled with the high-pressure turbine section 800 of the multi-stage steam turbine 1000.

Thus, the second side 220 of the valve support 200 faces, and/or is positioned proximate, the second side 320 of the valve body 300.

Figure 3B:
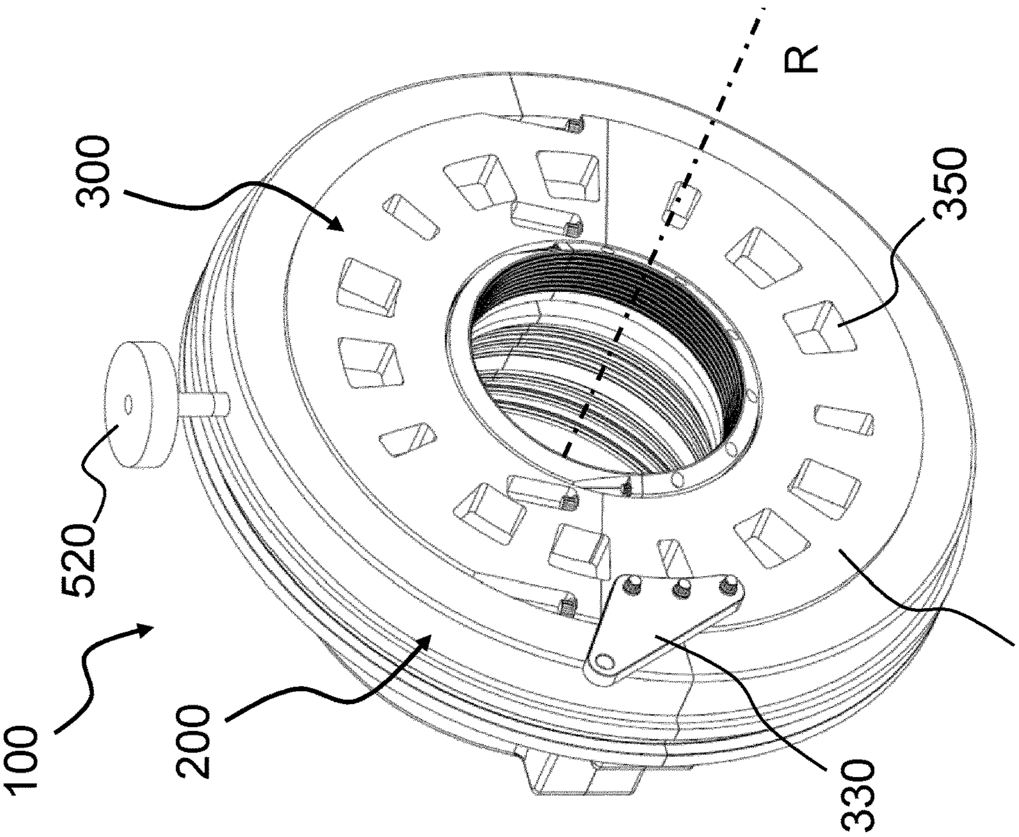
FIG. 3B shows a second side view, in particular a view on valve body side, of the balanced grid valve of FIG. 2.
Figure 3A:
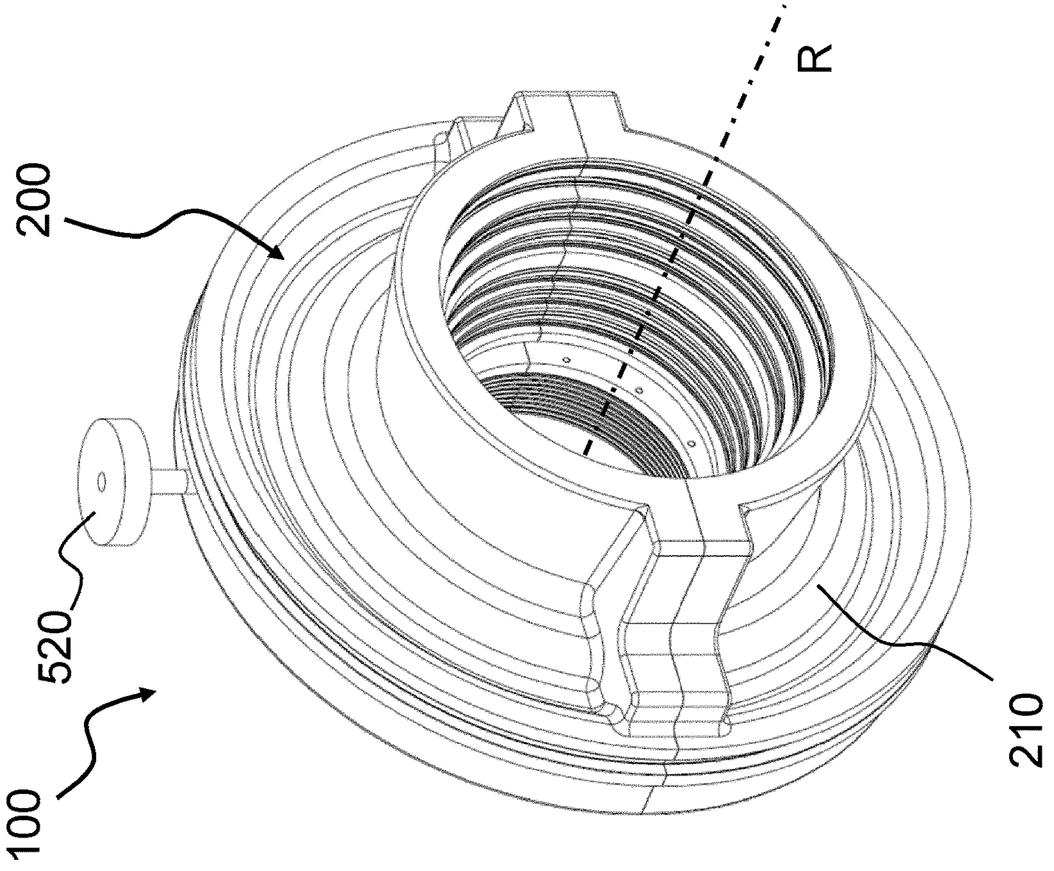
FIG. 3A shows a first side view, in particular a view on valve support side, of the balanced grid valve of FIG. 2.

With non-limiting reference to FIG. 3A and FIG. 3B, it is shown respectively a first side view, in particular a view on valve support 200 side, of the balanced grid valve 100 and a second side view, in particular a view on valve body 300 side, of the balanced grid valve 100. The valve support 200 is shown by way of example, as a fixed ring-shaped valve support; and the valve body 300 is shown by way of example as a rotatably ring-shaped valve body; the ring-shaped valve support 200 and the ring-shaped valve body 300 have a common center horizontal axis R around which the valve support 200 and valve body 300 is formed.

Figure 4:
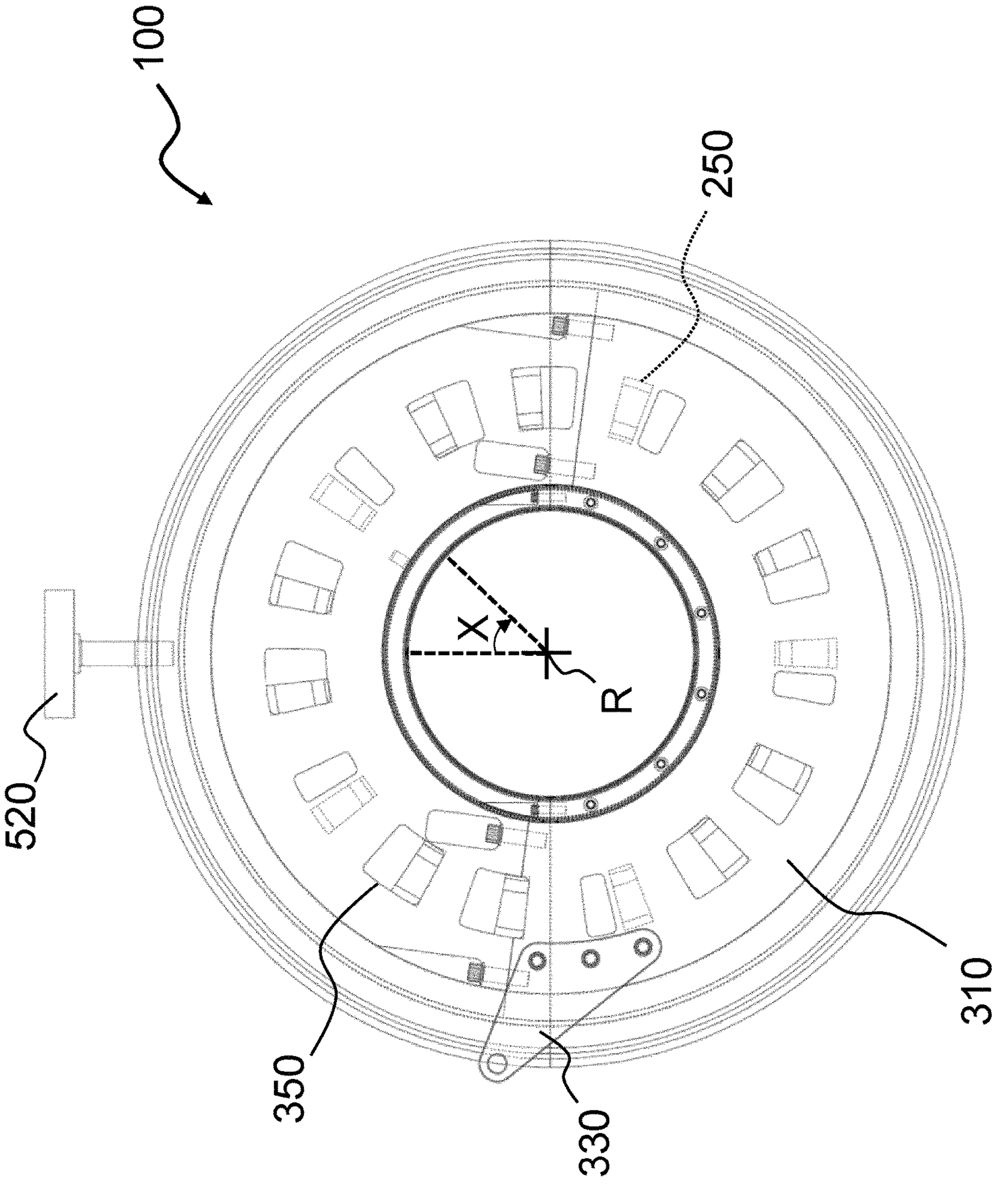
FIG. 4 shows a front view, in particular a view on valve body side, of the balanced grid valve of FIG. 2 partially open.
Figure 5:
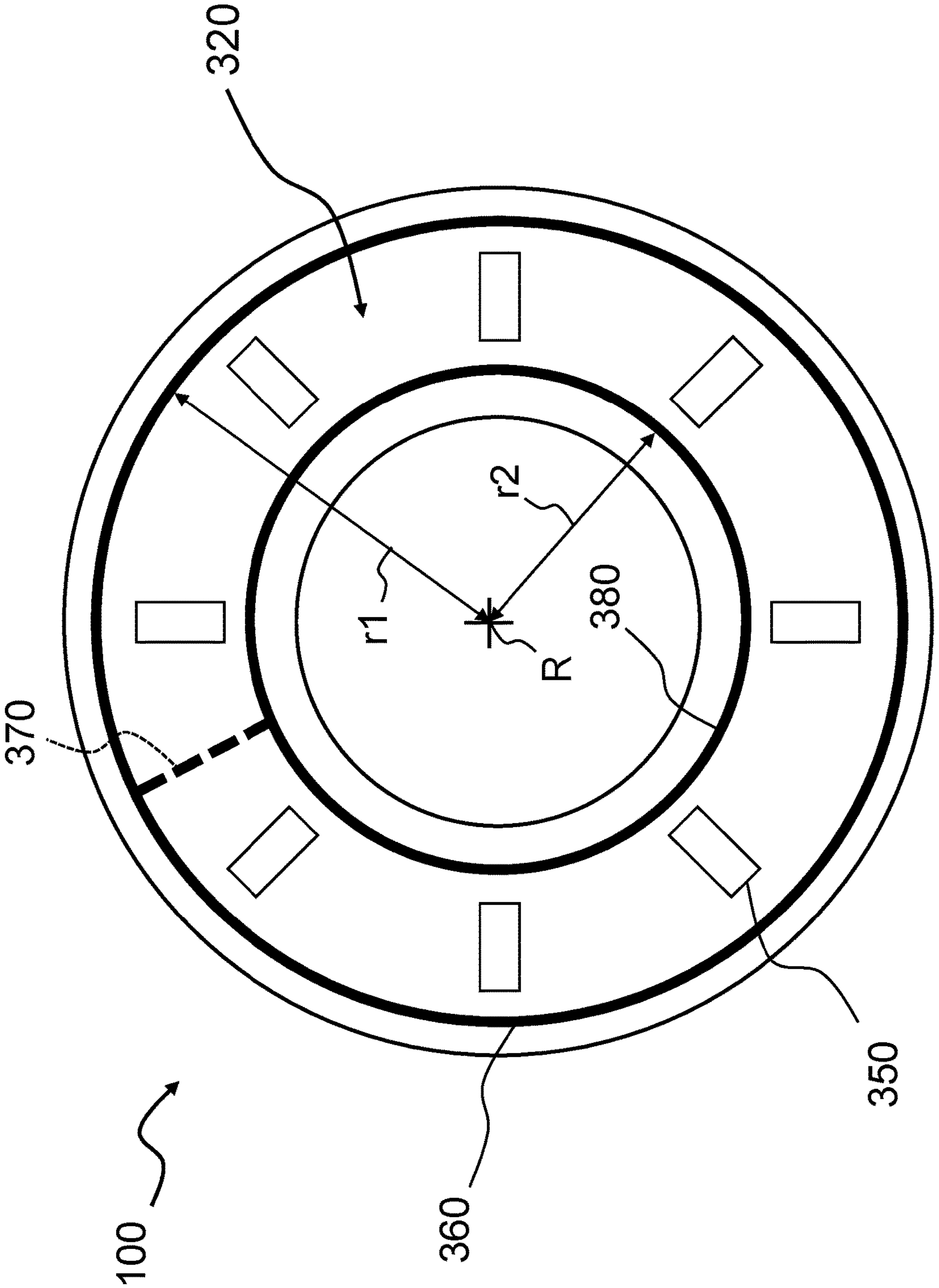
FIG. 5 shows a schematic view of a valve body of the balanced grid valve of FIG. 2.

As shown in FIG. 3B, FIG. 4 and FIG. 5, the valve support 200 and the valve body 300 have openings 250, 350 that are configured to define an adjustable flow passage for the fluid flow, e.g., steam flow. In particular, the adjustable flow passage is function of the relative rotation angle X between the valve support 200 and the valve body 300; with non-limiting reference to FIG. 4, the relative rotation angle X is measured with respect to an arbitrary vertical direction of the valve support 200 (see for example the vertical dashed line from which the arrow X originates) and a new direction obtained after rotating the valve body 300 relative to the valve support 200 by an angle X (see for example the dashed oblique line where the arrow X ends). In other words, the arrow X is the relative rotation angle X of the valve body 300 with respect to the arbitrary vertical direction of the valve support 200. Advantageously, openings 250 on the valve support 200 correspond to openings 350 on the valve body 300, so that there is at least a rotation angle wherein openings 350 are totally overlapped to openings 250; according to certain angles of rotation, instead, openings 350 are partially overlapped to openings 250; finally, according to at least a rotation angle, openings 350 are not overlapped at all to openings 250.

To regulate the steam flow that passes through the balanced grid valve 100 and thus the pressure of the steam extracted through the flange 400, the valve body 300 can be rotated, manually or automatically via an actuator, with respect to the valve support 200, varying the relative rotation angle X and therefore the adjustable flow passage defined by openings 250 and 350. Advantageously, the valve body 300 is mechanically coupled to an actuator, in particular a linear actuator that converts linear motion into rotary motion. As shown in FIG. 3B and FIG. 4, the valve body 300 comprises a connection device 330, such as a mechanical bracket, which is coupled to the linear actuator and transmit the motion from the linear actuator to the valve body 300, in order to rotate the valve body 300. In particular, the valve body 300 may be rotated at installation and/or during operation. More in particular, during operation, the valve body 300 may be rotated one or more times: for example, the valve body 300 may perform a continuous slow rotation in order to complete one full stroke of the relative rotation angle X once per day (the full stroke may be about 10° and in any case depends on the number of openings 250, 350 used), or may perform a quick rotation, for example three small rotations (below 1°) per hour.

According to a non-limiting to the embodiment, as particularly shown in FIG. 5, the rotatable valve body 300 comprises a first groove 360 and a second groove 380 arranged at the second side 320 of the valve body 300. It is to be noted that the first groove 360 is arranged at a first radial distance "r1" from the axis R and the second groove 380 is arranged at a second radial distance "r2" from the axis R, the first radial distance "r1" being greater than the second radial distance "r2".

Advantageously, the first groove 360 and the second groove 380 are annular grooves arranged around the center horizontal axis R; in particular, the first groove 360 and the second groove 380 define a first circle (having radius "r1") and a second circle (having radius "r2") which encircle the axis R. Advantageously, the first groove 360 and the second groove 380 have the same width (defined with respect to the radial direction) and depth (defined with respect to the axial direction).

More advantageously, the openings 350 of the valve body 300 are arranged between the first groove 360 and the second groove 380; in other words, the centers of the openings 350 of the valve body 300 are arranged at a third radial distance from the axis R, the third radial distance being greater than the second radial distance "r2" but less than the first radial distance "r1". Advantageously, the openings 250 of the valve support 200 are arranged at the same third radial distance from the axis R of the openings 350 of the valve body 300 and may have the same shape.

With non-limiting reference to FIG. 2, the first groove 360 and the second groove 380 are configured to create a first balancing chamber 460 and a second balancing chamber 480 when the valve body 300 is coupled with the valve support 200.

The first groove 360 is configured to receive steam at a third pressure, so that the first balancing chamber 460 is subject to a third pressure; the third pressure is greater than the second pressure (i.e. the pressure upstream the valve). The second groove 380 is configured to receive steam at a fourth pressure, so that the second balancing chamber 480 is subject to a fourth pressure; the fourth pressure is greater than the second pressure (i.e. the pressure upstream the valve).

According but non-limiting to the embodiment, as shown in FIG. 5, the valve 100, in particular the valve body 300, comprises further an inner channel 370 that fluidly couples the first groove 360 and the second groove 380; advantageously, in this case, the third pressure is equal or substantially equal to the fourth pressure. In particular, the first groove 360 is configured to receive steam at a third pressure, the steam flows through the inner channel 370 and is supplied to the second groove 380. It is to be noted that, if no pressure loss is caused by the flowing through the inner channel 370, the steam received by the second groove 380 (i.e. in the second chamber 480) is at the same third pressure of the steam received by first groove 360 (i.e. in the first chamber 460).

According to the configuration described above, when the first groove 360 and the second groove 380 receive the steam, the balanced grid valve 100 has substantially two equal forces above and below the openings 350 of the valve body 300 (wherein "above" and "below" are defined with respect to the develop of the openings 350 in radial direction).

According to some alternative embodiments, the first groove and the second groove are located on the valve support, as well as the inner channel, and be configured to create a first balancing chamber and a second balancing chamber when the valve body is coupled with the valve support. According to some other alternative embodiments, the first groove is located on the valve support or the valve body and, to the contrary, the second groove is located on the valve body or the valve support.

With non-limiting reference to FIG. 1, the multi-stage steam turbine 1000 further comprises a duct 500; the duct 500 has a first end arranged to be fluidly coupled to a stage of the multi-stage steam turbine 1000 located upstream the balanced grid valve 100, in particular to a high-pressure stage of the high-pressure turbine section 800.

The duct 500 has a second end arranged to be fluidly coupled to the balanced grid valve 100, in particular to a flange 520; advantageously, the flange 520 is provided with a suitable seal to prevent steam leakages; the flange 520 is fluidly coupled to the first groove 360. The duct 500 is arranged to supply the steam to the first groove 360 at the third pressure, for example at the pressure of the high-pressure stage of the high-pressure turbine section 800 wherein the first end is coupled.

Advantageously, the duct 500 is provided with a valve 510, in particular a regulating valve, in order to regulate the steam that flows through the duct 500 and that is supplied to the balanced grid valve 100.

In operation, with reference to FIGS. 1 and 2, a fluid such as steam enters an inlet of the rotating equipment 1000, which may be a multi-stage steam turbine, is expanded through the rotating equipment 1000, in particular though blades of the equipment, and exits an outlet of the rotating equipment 1000. The steam which flows through the rotating equipment 1000 is extracted from an intermediate section of the equipment through the balanced grid valve 100. The valve 100 has openings 250, 350 in which part of the steam can flow to continue steam expansion and an annular chamber 600, upstream the valve 100, from which part of the steam is extracted. The balanced grid valve 100 has grooves 360, 380 where part of the steam flowing upstream the valve 100, preferably taken from the inlet of the rotating equipment 1000 or nearby, may be injected through at least a duct 500. In particular, is the duct 500 is provided with a valve 510 which regulates the steam supplied to the grooves 360, 380 of the valve 100. Preferably, the steam is supplied to the grooves 360, 380 only when the valve body 300 is rotated with respect to the valve support 200, in order to reduce the friction between them. More preferably, the valve 510 allows steam to be supplied to the grooves 360, 380 when it is actuated by an actuator which receives digital control signals or when it is actuated manually.

It is to be noted that in some embodiments, the multi-stage steam turbine 1000 may comprise a first duct fluidly coupled to the first groove 360 and to a first high-pressure stage of the high-pressure section 800 of the multi-stage steam turbine 1000 and a second duct fluidly coupled to the second groove 380 and to a second high-pressure stage of the high-pressure section 800 of the multi-stage steam turbine 1000; the first duct is arranged to supply the steam to the first groove 360 at the third pressure, in particular at the pressure of the first high-pressure stage; the second duct is arranged to supply the steam to the second groove 380 at the fourth pressure, in particular at the pressure of the second high-pressure stage It is also to be noted that the first high-pressure stage and the second high-pressure stage may not correspond to the first high-pressure stage and the second high-pressure stage that are located directly downstream the inlet of the high-pressure section 800 of the multi-stage steam turbine 1000.

The invention claimed is:

1. A balanced grid valve for steam extraction from a multi-stage steam turbine configured to process a steam flow, the balanced grid valve comprising:
- a multi-piece body comprising:
  - a ring-shaped valve support having a first side and a second side;
  - a ring-shaped valve body mechanically coupled to the ring-shaped valve support and rotatable relative to the ring-shaped valve support around an axis, the ring-shaped valve body having a first side and a second side, the second side of the ring-shaped valve body facing the second side of the ring-shaped valve support;
  - annular grooves disposed in the second side of each of the ring-shaped valve support and the ring-shaped valve body, the annular grooves comprising a first groove and a second groove, each circumscribing the axis,
  - openings in the ring-shaped valve support and the ring-shaped valve body radially spaced apart from the axis so as to reside between the annular grooves, the openings defining an adjustable flow passage through the multi-piece body that depends on a relative rotation angle between the ring-shaped valve body and the ring-shaped valve support; and
  - a duct coupled to the first groove and the second groove,
  - wherein the first groove is disposed a first radial distance from the axis, the second groove is disposed a second radial distance from the axis that is less than the first radial distance, and
  - wherein the second groove is spaced apart from the peripheral edge of the ring-shaped valve support and the ring-shaped valve body,
- wherein the first groove and the second groove are configured to create respectively a first balancing chamber and a second balancing chamber between the valve support and the valve body.

2. The balanced grid valve of claim 1, further comprising:
- an inner channel fluidly coupling the first groove to the second groove.

3. The balanced grid valve of claim 1, further comprising:
- an inner channel fluidly coupling the first groove to the second groove,
- wherein the inner channel is arranged between two adjacent openings.

4. The balanced grid valve of claim 1, wherein the duct is provided with a regulating valve.

5. A multi-stage steam turbine comprising:
- a balanced grid valve according to claim 1,
- wherein the balanced grid valve is arranged between two intermediate stages of the multi-stage steam turbine.

6. The multi-stage steam turbine of claim 5, wherein the duct has a first end and a second end, the first end fluidly coupled to a stage of the multi-stage steam turbine located upstream the balanced grid valve and the second end fluidly coupled to the first groove and the second groove.

7. The multi-stage steam turbine of claim 5, further comprising: a regulating valve disposed in the duct.

8. The balanced grid valve of claim 1, further comprising:
- a valve coupled with the duct.

9. The balanced grid valve of claim 1, further comprising:
- a regulating valve coupled with the duct.

10. A balanced grid valve, comprising:
- a ring-shaped valve support having a first side and a second side,
- a ring-shaped valve body mechanically coupled to the ring-shaped valve support and rotatable relative to the ring-shaped valve support around an axis, the ring-shaped valve body having a first side and a second side, the second side of the ring-shaped valve body facing the second side of the ring-shaped valve support;
- an outer annular groove and an inner annular disposed in the ring-shaped valve support and the ring-shaped valve body, each of the first annular groove and the second annular groove circumscribing the axis;
- an adjustable flow passage through the ring-shaped valve support and the ring-shaped valve body; and
- a duct coupled to the first groove and the second groove.

11. The balanced grid valve of claim 10, wherein the first groove is disposed a first radial distance from the axis.

12. The balanced grid valve of claim 10, wherein the second groove is disposed a second radial distance from the axis that is less than the first radial distance.

13. The balanced grid valve of claim 10, wherein the second groove is spaced apart from the peripheral edge of the ring-shaped valve support and the ring-shaped valve body.

14. The balanced grid valve of claim 10, wherein flow through the adjustable flow path depends on a relative rotation angle between the ring-shaped valve body and the ring-shaped valve support.

15. The balanced grid valve of claim 10, further comprising:
- a connection device disposed on the ring-shaped valve body.

16. The balanced grid valve of claim 10, further comprising:

a metal bracket disposed on the ring-shaped valve body, the metal bracket having a body that extends radially way from the axis.

17. The balanced grid valve of claim 10, further comprising:

a metal bracket disposed on the ring-shaped valve body, the metal bracket having an opening disposed radially outside an outer edge of the ring-shaped valve body.

18. The balanced grid valve of claim 10, further comprising:

a flange coupled to the ring-shaped valve body, wherein the flange is fluidly coupled to the outer annular groove.

19. The balanced grid valve of claim 10, further comprising:

a flange coupled to the ring-shaped valve body, wherein the flange is fluidly coupled to the outer annular groove, and wherein the duct couples to the flange.

20. A multi-stage steam turbine comprising:

a balanced grid valve according to claim 10.

* * * * *